United States Patent

[11] 3,587,356

[72] Inventors Clarence R. Ferguson
　　　　　　 Argonia, Kans.;
　　　　　　 Rubie E. Periman, Owasso, Okla.
[21] Appl. No. 850,058
[22] Filed Aug. 14, 1969
[45] Patented June 28, 1971

[54] SAW SET
　　　 7 Claims, 2 Drawing Figs.
[52] U.S. Cl. .............................................. 76/64
[51] Int. Cl. ........................................... B23d 63/02
[50] Field of Search ................................. 76/64, 69,
　　　　　　　　　　　　　　　　　　　　　　　 63, 68, 58

[56] References Cited
UNITED STATES PATENTS
2,289,114 7/1942 Frizzell ........................ 76/69
2,493,850 1/1950 Blackmon ................... 76/68

Primary Examiner—Bernard Stickney
Attorney—Schmidt, Johnson, Hovey, Williams and Chase ABSTRACT: A saw-setting tool has a pair of opposed jaws hingedly interconnected to a pair of handles for opening and closing of the jaws. An adjustable spindle is provided on the lower jaw for rotatably supporting a rotary blade during location of alternate, successive teeth of the blade for deflection between a plunger and anvil on the jaws. A flexible blade stop on each side of the tool is provided for engaging and indexing the blade during rotation of the latter, and a limit member on the upper jaw abuts the blade during closure of the jaws to insure uniform deflection of each tooth and prevent deformation of the body of the blade.

PATENTED JUN 28 1971
3,587,356
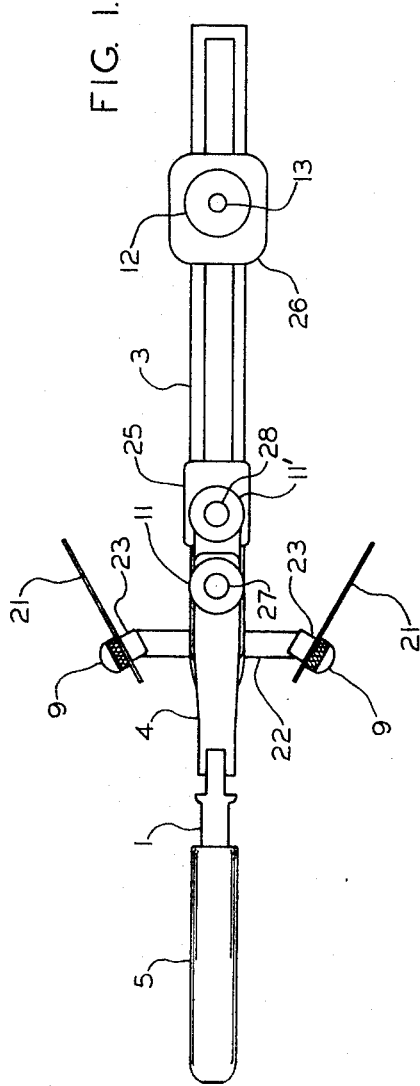
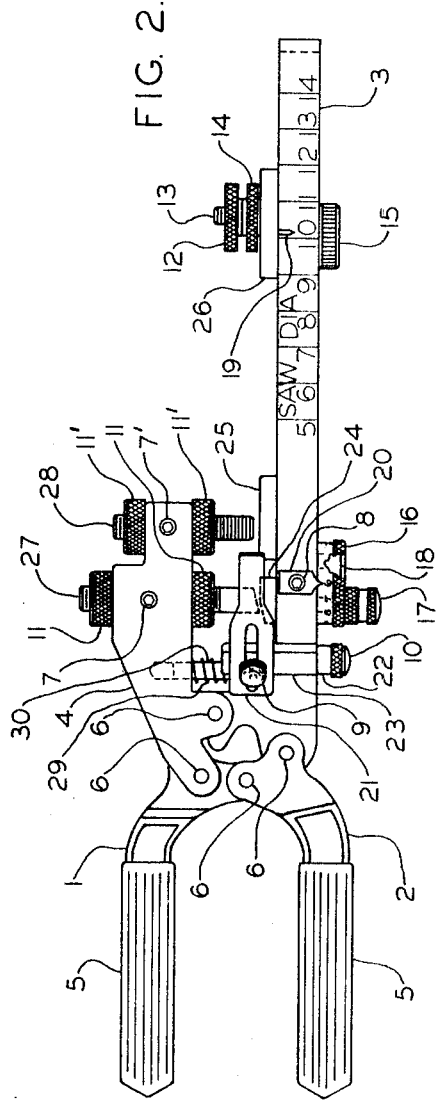
INVENTORS.
Clarence R. Ferguson
Rubie E. Periman
BY
Schmidt, Johnson, Hovey,
Williams & Chase.
ATTORNEYS.

SAW SET

The present invention relates to hand tools and, more particularly, to a device for setting the teeth of saw blades.

Successive teeth of most rotary and straight saw blades today are bent or deflected in opposite directions from the surface of the blade. This practice provides for a saw cut which is wider than the body of the blade, thus permitting the latter to pass through the cut without binding. Such deflection is commonly referred to as "set," and a saw blade is said to have "heavy" or "light" set depending upon that portion of each tooth which is deflected. For example, if only the tip portion of each tooth is deflected, the blade has light set, while if the entire amount of each tooth is deflected, the blade has heavy set. Manifestly, set is a relative quality since blades with fine teeth, as well as those with coarse teeth, may have heavy set.

After repeated use, the blades lose their set, at which time each tooth must once again be set to the proper angle. While any conventional gripping tool, such as pliers, might be used to bend the teeth, it is important that they be deflected at a uniform angle and that an identical portion of each tooth is deflected. Failure to achieve such uniformity results in a saw cut which is rough and uneven.

Accordingly, it is an important object of the present invention to provide a saw-setting tool for both rotary and straight saw blades which is simple to operate, yet permits rapid, uniform deflection of each tooth.

As a corollary to the above it is an important object to provide limit structure on the jaws of the aforesaid tool which may be adjusted to restrict the deflection of each tooth to a predetermined angle, while at the same time gripping the body of the blade to insure that deformation thereof does not occur.

Another important object is the provision of an adjustable plunger and anvil on the jaws of the setting tool, whereby the portion of each tooth deflected may be varied and the tool may accommodate saw teeth of various sizes.

A further important object of the invention is to provide a setting tool which is equally effective for rotary saw blades of various diameters.

In the drawing:

FIG. 1 is a top plan view of a saw set embodying the principles of the present invention; and FIG. 2 is a side elevational view thereof.

The saw set of the present invention is constructed generally in the nature of a gripping or clamping tool such as pliers, and accordingly, has a pair of handles 1 and 2 hingedly connected to a pair of opposed jaws 3 and 4 by pivot pins 6 for opening and closing movement. Handles 1 and 2 are provided with rubberized grips 5 to facilitate manipulation of the tool.

The jaws 3 and 4 are guided during their opening and closing movements by an upright guidepost 30 on the lower jaw 3 which is received within an opening in the upper jaw 4. A coil spring 29 about guidepost 30 engages jaws 3 and 4.

An anvil 24 having an upper inclined surface is mounted for adjustment along lower jaw 3 and projects upwardly therefrom to cooperate with an elongated plunger 27 projecting downwardly from upper jaw 4. The lowermost end of plunger 27 is beveled to present an inclined face which is normally disposed in alignment with the inclined surface of anvil 24 when the saw set is in use. Plunger 27 extends through the upper jaw 4 and is adjustably secured thereto by a pair of mounting nuts 11. A setscrew 7 through the side of jaw 4 intersects the plunger 27 and releasably retains the latter against rotation.

An anvil-locking screw 17 extends through lower jaw 3 and clamps an adjusting knob 16 to the underside thereof. A cam opening 18 in knob 16 receives the locking screw 17 to provide for the adjustment of anvil 24 upon rotation of knob 16. Suitable indicia on the knob 16 register with a pointer 20 secured to jaw 3 by a fastening screw 8. In this manner the anvil 24 may be incrementally shifted along jaw 3 to present varying amounts of its inclined surface in alignment with the inclined face of plunger 27.

A blade rest 25 on jaw 3 is disposed in alignment with an elongated member 28 extending downwardly through upper jaw 4 for limiting jaws 3 and 4 to a predetermined amount of closure. Mounting nuts 11' adjustably secure member 28 to jaw 4, and a setscrew 7' holds member 28 against rotation.

The embodiment of the saw set as shown in FIGS. 1 and 2 is particularly adapted for use in setting the teeth of rotary saw blades. To this end, lower jaw 3 beyond rest 25 is elongated and longitudinally slotted to receive an adjusting screw 15 projecting upwardly therethrough to retain a second blade rest 26. An upright threaded spindle 13 on the blade rest 26 is provided to project through the arbor hole of a rotary blade (not shown). A pair of clamping nuts 12 and 14 are provided to clamp such a blade between nut 14 and the rest 26, and a finger 19 projecting downwardly from rest 26 registers with suitable saw diameter indicia along jaw 3.

A transverse bracket 22 is secured beneath lower jaw 3 by a bracket screw 10 and supports a pair of upright arms 23 disposed on opposite sides of the saw set. A screw 9 at the upper end of each upright arm 23 adjustably fastens a longitudinally slotted, flexible blade stop 21 thereto. The stops 21 are constructed of flexible steel or the like and project obliquely from the saw set in opposing directions.

As previously mentioned, the present embodiment of the saw set is especially well suited for setting the teeth of rotary saw blades. Slight modifications, including removal of the flexible stops 21, would prepare the saw set to accommodate straight saw blades as well. It may be appreciated that the basic principles of operation of the present saw set as will hereinafter be described may be applied to setting a straight blade also.

To set a rotary blade the jaws 3 and 4 must initially be opened by manipulation of the handles 1 and 2. The blade may then be placed on the rests 25 and 26 so that the peripheral margin thereof is supported on anvil 24. With spindle 13 extending through the arbor hole in the blade, the clamping nuts 12 and 14 may be used to rigidly secure the blade in position. The blade rest 26 should be located such that the finger 19 indicates the diameter of the blade being set and, with the blade in this position, one of the flexible stops 21 may be adjusted to project between a pair of the teeth.

It is to be noted that successive teeth of the blade must be set in alternating directions. Accordingly, one-half of all of the teeth are set with the blade lying on one side, the remaining half of the teeth being set when the blade is overturned to lie on its opposite side. Further, the blade is rotated on spindle 13 in only one direction for each side, and only one of the flexible stops 21 is utilized at a time, that being the one which is oriented in the oblique direction corresponding generally to that of blade rotation. In this manner, the spindle 13 and the appropriate stop 21 cooperate to index successive, alternate teeth upon rotation of the blade and precisely locate each of them in their successive positions on anvil 24.

It may be recalled that the set of a saw blade is determined by the proportion of each tooth which is deflected from the surface of the blade. Accordingly, adjustment of the anvil 24 along jaw 3 relative to plunger 27 brings a corresponding amount of the inclined surface of anvil 24 in alignment with the inclined face of plunger 27. Since only that portion of the tooth overlying the inclined surface will be deflected, location of anvil 24 determines the set of the blade. When the desired set has been chosen with plunger 27 vertically adjusted in its proper position, the handles 1 and 2 may once again be manipulated to close jaws 3 and 4 whereby to clamp the saw tooth between plunger 27 and anvil 24.

The limit member 28 insures that the clamped tooth will not be overdeflected or damaged by the application of excessive force on handles 1 and 2. It will be appreciated, therefore, that so long as sufficient force is applied through handles 1 and 2, the plunger 27 and anvil 24 will deflect all teeth equally, thereby providing a uniform set about the entire periphery of the saw blade.

Further, since member 28 and blade rest 25 are spaced from anvil 24 in the direction of spindle 13 and engage opposite sides of the blade, they brace the latter against deformation thereof while functioning as limit structure. This is particularly noteworthy inasmuch as the blade has a tendency to assume such deformation in the vicinity of member 28 while its teeth are being deflected.

When one teeth has been deflected by the clamping action of the corresponding inclined surface of plunger 27 and anvil 24, it is but necessary to slightly open jaws 3 and 4 to permit rotation of the blade against the action of the appropriate flexible stop 21. Alternate teeth should be located for deflection in this manner until the blade has been rotated 360°. Jaws 3 and 4 may then be opened, the clamping nuts 12 and 14 released, and the blade overturned to present the remaining teeth for setting. At this time, the blade will be rotated in the opposite direction to that of the above, and the other flexible stop 21 will be employed to index the teeth. The same manner of clamping action is applied with the blade disposed in this position.

The adjustable nature of anvil 24 not only permits saw blades to be provided with various degrees of "heavy" and "light" sets, but also permits the setting of various sizes of teeth. In this regard, it is suggested that the adjusting knob 16 be provided with a numeral such as 0 that refers to a position in which no part of the tooth is overlying the inclined surface of anvil 24. Therefore, whether the teeth of a blade are coarse or fine, all blades have the same point of reference at which no deflection at all will take place. Then, as the adjusting knob 16 is rotated to indicate higher numerals or other indicia thereon, the proportion of each tooth overlying the inclined surface will increase, although more rapidly for fine teeth than for coarse teeth. Manifestly, the set increases in direct relation to the proportion of tooth exposed.

It will be appreciated that the present saw set provides an unusually sturdy and precise means for setting saw blades. Yet, the set is easy to use and affords little opportunity for operator error when the cooperating, shiftable parts thereof have been properly adjusted.

Having thus described the invention, what is claimed as new and desired to be secured by Letters Patent is:

We claim:

1. A device for setting saw blades comprising:
   a pair of opposed jaws relatively shiftable from an open to a closed relationship;
   said jaws in said open relationship being spaced apart for receiving a toothed saw blade therebetween;
   an anvil on one of said jaws for supporting said blade and having an inclined surface underlying a tooth on the blade when the latter is disposed between said jaws;
   a plunger on the other of said jaws having an inclined face in alignment with said surface whereby, when said jaws are shifted to their closed relationship, said tooth is clamped between the face and the surface and set to a predetermined angle; and
   limit structure on said jaws spaced from said plunger and engaging opposite sides of the blade when the latter is disposed between the jaws and the same are shifted to their closed relationship, whereby to restrict the set of said tooth to said predetermined angle and prevent deformation of the blade.

2. The blade-setting device as claimed in claim 1, said anvil means being transversely shiftable relative to said plunger to present varying amounts of said inclined surface in alignment with said inclined face, whereby to vary the set of said tooth.

3. The blade-setting device as claimed in claim 1, said plunger being adjustable relative to said anvil to accommodate saw blades of various thicknesses.

4. The blade-setting device as claimed in claim 1, said limit structure including an adjustable member on said other jaw, and an abutment on said one jaw.

5. The blade-setting device as claimed in claim 1, and indexing means on said jaws for rotatably supporting said blade and precisely locating successive teeth on the latter between said face and said surface.

6. The blade-setting device as claimed in claim 5, said indexing means including a spindle on said one jaw spaced from said inclined surface, and yieldable stop means disposed for projection between a pair of said teeth when the blade is on said spindle.

7. The blade-setting device as claimed in claim 6, said spindle being shiftably mounted on said one jaw for adjustment toward and away from said inclined surface, thereby permitting saw blades of various diameters to be set.